(12) United States Patent
Chathukutty et al.

(10) Patent No.: US 11,233,977 B2
(45) Date of Patent: Jan. 25, 2022

(54) SYSTEM AND METHOD FOR MAPPING OF TEXT EVENTS FROM MULTIPLE SOURCES WITH CAMERA OUTPUTS

(71) Applicant: Honeywell International Inc., Morris Plains, NJ (US)

(72) Inventors: Silky Chathukutty, Bangalore (IN); Vijay Dhamija, Bangalore (IN); Marine Drive, Bangalore (IN); Chaithanya Holla, Bangalore (IN); Jeetendra Kumar Mallireddy, Bangalore (IN); Arun Pattali, Bangalore (IN); Sandeep Pundlik, Bangalore (IN)

(73) Assignee: HONEYWELL INTERNATIONAL INC., Maple Grove, MN (US)

( * ) Notice: Subject to any disclaimer, the term of this patent is extended or adjusted under 35 U.S.C. 154(b) by 14 days.

(21) Appl. No.: 16/418,862

(22) Filed: May 21, 2019

(65) Prior Publication Data

US 2019/0273893 A1 Sep. 5, 2019

Related U.S. Application Data

(63) Continuation of application No. 12/044,528, filed on Mar. 7, 2008, now Pat. No. 10,341,615.

(51) Int. Cl.
*H04N 7/18* (2006.01)
*G08B 13/196* (2006.01)

(52) U.S. Cl.
CPC ....... *H04N 7/181* (2013.01); *G08B 13/19645* (2013.01); *G08B 13/19671* (2013.01); *H04N 7/185* (2013.01)

(58) Field of Classification Search
CPC .. H04N 7/181; H04N 7/185; G08B 13/19645; G08B 13/19671
USPC ......................................................... 348/143
See application file for complete search history.

(56) References Cited

U.S. PATENT DOCUMENTS

| 4,326,218 A | 4/1982 | Coutta et al. |
| 4,630,110 A | 12/1986 | Cotton et al. |
| 4,991,008 A | 2/1991 | Nama |
| 5,128,755 A | 7/1992 | Fancher |
| 5,491,511 A | 2/1996 | Odle |
| 5,956,081 A | 9/1999 | Katz et al. |

(Continued)

*Primary Examiner* — Allen C Wong
(74) *Attorney, Agent, or Firm* — Seager, Tufte & Wickhem, LLP

(57) ABSTRACT

A system and method for mapping of text events from multiple sources with camera outputs is provided. The system includes a CCTV keyboard for assigning each surveillance camera to one or more zones containing one or more point of transaction devices; a capture section for receiving data: from one of the one or more transaction devices when the capture section receives a data request command from the CCTV keyboard; and a CCTV switching system for displaying video: from the at least one or more surveillance cameras and data from the transaction device. The method assigns each surveillance camera to one or more zones containing one or more transaction devices; receives data: from one of the one or more transaction devices when the data request command is received; and displays video from the at least one or more surveillance cameras and data from the transaction device.

18 Claims, 2 Drawing Sheets

(56) References Cited

U.S. PATENT DOCUMENTS

| | | |
|---|---|---|
| 6,012,040 A * | 1/2000 | Goodwin, III ....... G06Q 20/202 705/20 |
| 6,438,696 B1 | 8/2002 | Baran et al. |
| 7,304,662 B1 | 12/2007 | Sullivan et al. |
| 2002/0075403 A1 * | 6/2002 | Barone, Jr. ........ H04N 5/44513 348/461 |
| 2002/0140819 A1 | 10/2002 | Waehner et al. |
| 2003/0098910 A1 | 5/2003 | Kim |
| 2003/0197782 A1 | 10/2003 | Ashe et al. |
| 2004/0130623 A1 | 7/2004 | Han |
| 2004/0136388 A1 | 7/2004 | Schaff |
| 2004/0212679 A1 | 10/2004 | Jun |
| 2005/0012818 A1 | 1/2005 | Kiely et al. |
| 2005/0046697 A1 | 3/2005 | VanCleave et al. |
| 2005/0132414 A1 | 6/2005 | Bentley et al. |
| 2005/0177859 A1 * | 8/2005 | Valentino, III .. G08B 13/19682 725/105 |
| 2005/0259848 A1 | 11/2005 | Garoutte |
| 2006/0222206 A1 * | 10/2006 | Garoutte ................. H04N 7/18 382/103 |
| 2006/0279628 A1 | 12/2006 | Fleming |
| 2008/0050092 A1 | 2/2008 | Erickson |
| 2008/0136896 A1 | 6/2008 | Graham et al. |
| 2008/0199155 A1 | 8/2008 | Hagens et al. |
| 2008/0208698 A1 | 8/2008 | Olson et al. |
| 2009/0220206 A1 | 9/2009 | Kisliakov |

* cited by examiner

SYSTEM AND METHOD FOR MAPPING OF TEXT EVENTS FROM MULTIPLE SOURCES WITH CAMERA OUTPUTS

The present application is a continuation of U.S. patent application Ser. No. 12/044,528, filed Mar. 7, 2008, entitled, "SYSTEM AND METHOD FOR MAPPING OF TEXT EVENTS FROM MULTIPLE SOURCES WITH CAMERA OUTPUTS", which is hereby incorporated by reference.

FIELD OF THE INVENTION

The present invention relates generally to video recording and more specifically to a system and method for mapping text events from multiple sources with camera outputs.

BACKGROUND OF THE DISCLOSURE

Surveillance operators typically use a closed circuit TV (CCTV) monitoring system to monitor an area under surveillance for any suspicious activity through fixed or pan-tilt-zoom (PTZ) cameras. In areas where the operator might suspect something suspicious, i.e. at point-of-sale devices, ATMs, slot machines and gaming tables, etc., (collectively these devices are referred to hereinafter as transaction devices) the operator may need to view the transactions being generated in the area and/or by the monitored devices to confirm a fraudulent activity or theft.

A limitation to the conventional CCTV monitoring system is that if a tampering or software malfunction has occurred at the device, the operator is not notified through the CCTV monitoring system. Instead, the operator needs to use other applications that interface with and capture transactions from these devices and link the transactions with the CCTV video. However, it is not feasible for an operator to stop the current monitoring and go to other applications to view transaction events, thus this type of tampering can now only be detected at a later stage when a detailed report is generated by the application capturing the events and verified with video content. Such a surveillance workflow requires time and extra effort. In addition> by not identifying the tampering as it is occurring, there is a greater chance that the perpetrator may avoid capture altogether.

SUMMARY OF THE DISCLOSURE

An embodiment of the present invention includes a CCTV keyboard for assigning each surveillance camera to one or more zones containing one or more transaction devices; a capture section for receiving data from one of the one or more transaction devices when the capture section receives a data request command from the CCTV keyboard; and a CCTV switching system for displaying video from the at least one or more surveillance cameras and data from the transaction device.

Another embodiment of the present invention includes the steps of assigning each surveillance camera to one or more zones containing one or more transaction devices; receiving data from one of the one or more transaction devices when a data request command is received; and displaying video from the at least one or more surveillance cameras and data from the transaction device.

BRIEF DESCRIPTION OF THE DRAWINGS

These and other features aspects, and advantages of the present invention will become better understood with regard to the following description, appended claims, and accompanying drawings wherein:

DETAILED DESCRIPTION OF DISCLOSURE

Figure 1:
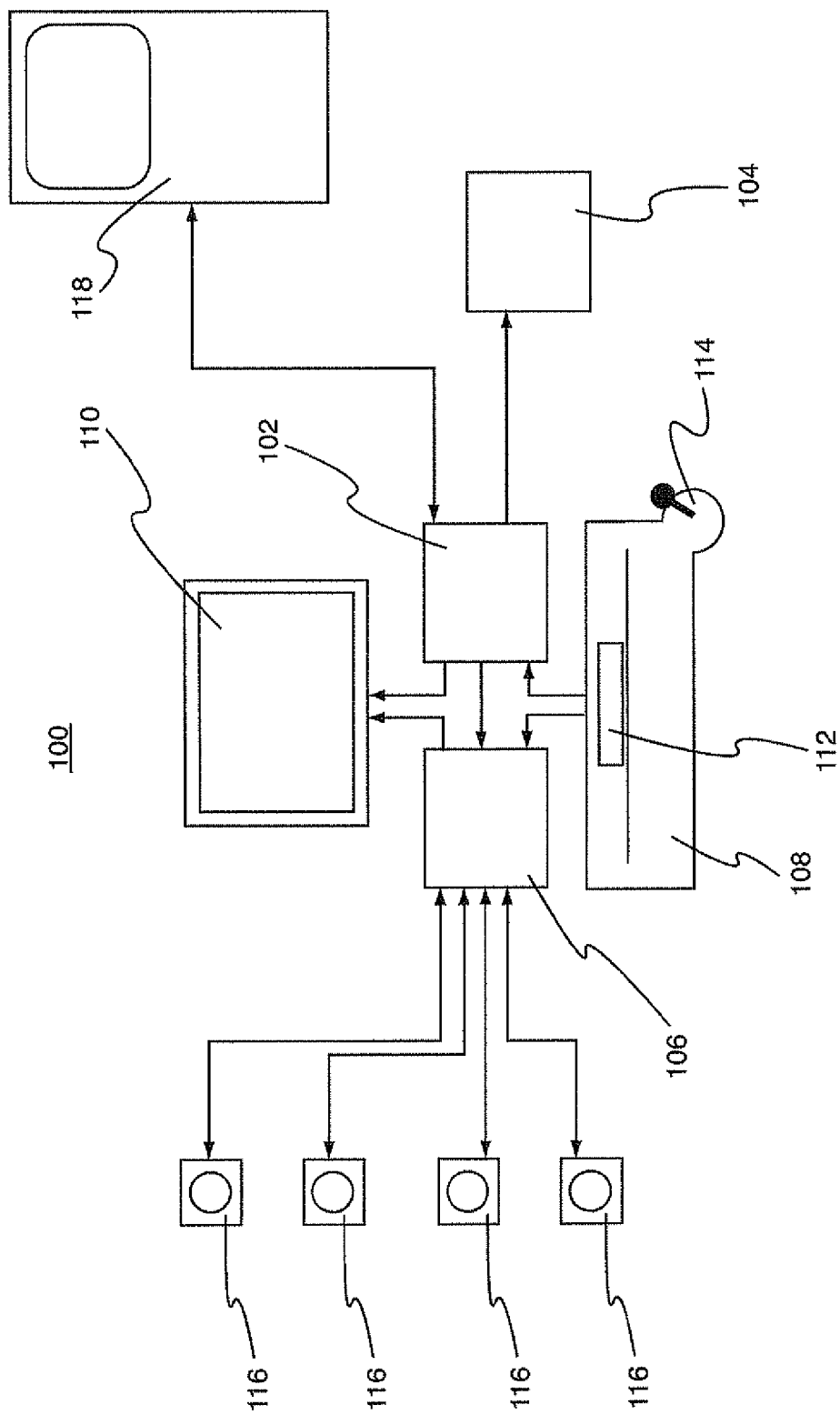
FIG. 1 illustrates a block representation of an embodiment of the present invention.

An embodiment of the present invention as shown in FIG. 1 provides a CCTV controller that provides the operator with the ability to view transaction data on demand. A capture section 102 captures transaction data from a point-of-sale device, slot machine, gaming table or any other similar device and stores it in a storage unit 106. Additionally, the capture section 102 transmits the capture data to a CCTV switching unit 106. A CCTV keyboard 108 is provided with an interface for retrieving device events at the request of the operator. The interface may be a keyboard button, dial, or other interface device known in the art. Additionally, the CCTV keyboard 108 is equipped with a display screen 112 for displaying user selectable menus tor selecting various options and settings. Also, the CCTV keyboard 108 is equipped with a controller for providing control signals to the capture section 102 and the CCTV switching unit 106.

With the present embodiment, the operator can immediately choose to view the transaction data at a device where suspicious activity is observed by interacting with the display 112 and interface. The operator can create data files containing video clips and/or the transaction data and other text such as operator comments. The video clips and transaction data may be stored in separate data files or combined into one data file. The data files are stored in a storage device 104, such as a hard disk, VCR, DVD, solid-state memory or other appropriate storage device.

In order to identify the device for which the data has to be shown, an embodiment of the present invention groups one or more monitored devices 118 with one or more cameras 116 in a zone. A zone may be a physical location such as a hallway or room. Alternatively, the one or more cameras 116 may be grouped using abstract criteria such as ownership of the monitored space. For example, the zones can be named as pool-side bar, food court, and so on. Each of these zones can have one or more point-of-sale or other devices in it; and each of these devices can be given an understandable logical name. These configurations can be performed through the CCTV keyboard 108 of the present invention.

When the operator requests for a video playback from the CCTV keyboard 108, the operator can choose to view the transaction data for that video using a menu driven interface provided by the CCTV keyboard 108. In this case the CCTV switching unit 106 sends a data request for a particular video frame timestamp to the capture section 102. The data received by the CCTV switching unit 106 is superimposed on the video and viewed on a video display device 110 or stored in the storage unit 104 as video clips. In addition to viewing previously stored transaction data and video clips, the operator can request to view current video and transaction data live as the transactions occur.

Moreover, the capture section 102 provides exception event notification received from the transaction devices 118 to the CCTV switching unit 106 along with other relevant device information from the device generating the exception. Exceptions refer to errors or faults, which are registered by the transaction device 118. These exceptions are transmitted to the capture section 104 regardless of whether data from the transaction device 118 is being currently viewed by the operator. CCTV keyboard 108 can be configured to automatically transmit a control signal to the CCTV switching unit 106 causing the CCTV switching unit 106 to switch to the camera 116 to which the transaction device 118 is assigned, and monitor the events on a video display device 110. CCTV keyboard 108 can identify the camera 116 from the zones/groups configuration mentioned above. A Preset zoom can be provided for each transaction device 118 along with the zone configuration. Further, when a camera 116 is viewed, all assigned transaction devices 118 can be viewed sequentially using scroll buttons (Up Arrow and Down Arrow) or dial.

Figure 2:
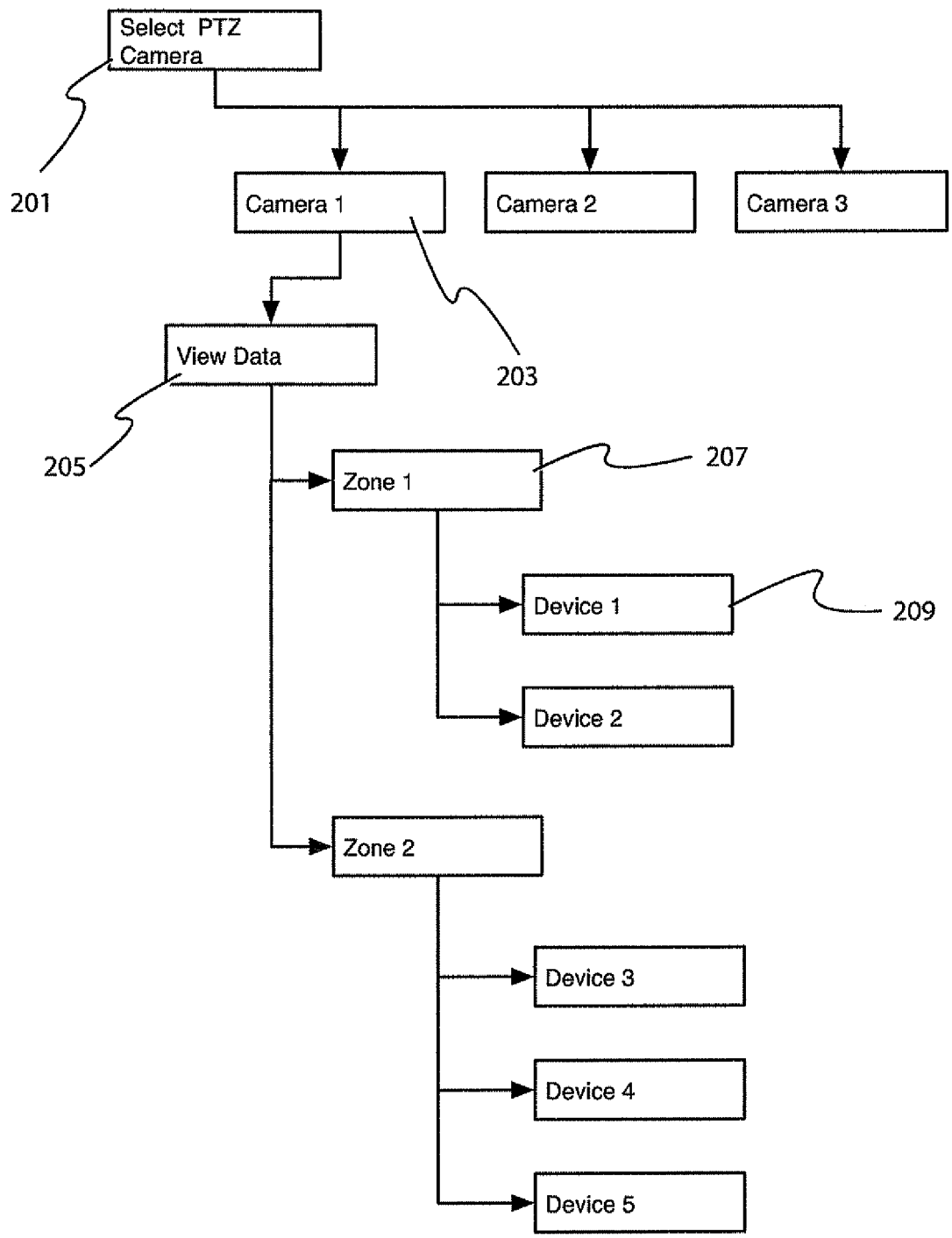
FIG. 2 illustrates a menu tree of an embodiment of the present invention.

In an embodiment of the present invention shown in FIG. 2, the operator can look at any device within the field of view of a selected camera, and request transaction data for it.

Initially an operator selects a camera to view and control in the case of PTZ cameras by entering menu 201 and selecting one of the listed cameras 203. When an operator chooses to view the data from a transaction device, a menu containing zones/groups with which the camera is associated 205 is displayed on the LCD screen 112 of the CCTV keyboard 108. The menus are configured for display at the touch of a designated button on the CCTV keyboard 108, or by navigation and selection of menu items. Once a zone a zone is selected, the operator is provided with a menu listing the transaction devices in the selected zone 207. The operator can then choose a transaction device from which to receive transaction data by selecting one of the listed transaction devices 209. The capture section 102 receives the transaction data from the selected transaction device and transmits the data to the monitor 110.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A video surveillance system comprising:
   a surveillance camera for capturing video;
   a transaction device within a field of view of the surveillance camera;
   a display;
   a controller operatively coupled to the surveillance camera, the transaction device, and the display, the controller comprising a switch operatively coupled to the transaction device, and in response to receiving an exception from the transaction device indicating an error or fault, the switch automatically causes the controller to display:
      video of a transaction at the transaction device captured by the surveillance camera; and
      text extracted from the transaction data corresponding to the transaction superimposed on the video of the transaction, wherein superimposition of the text on the video of the transaction includes placing the text on top of the video of the transaction.

2. The video surveillance system as in claim 1 wherein the controller is configured to further display:
   video of a subsequent transaction at the transaction device captured by the surveillance camera; and
   text extracted from the transaction data corresponding to the subsequent transaction superimposed on the video of the subsequent transaction.

3. The video surveillance system as in claim 1, wherein the controller is operatively coupled to a second surveillance camera and a second transaction device, and can receive second transaction data from the second transaction device and display:
   video of a second transaction at the second transaction device captured by the second surveillance camera; and
   text extracted from the second transaction data corresponding to the second transaction superimposed on the video of the second transaction.

4. The video surveillance system as in claim 1, wherein the switch is also operatively coupled to a second transaction device and a second surveillance camera, and in response to receiving an exception from the second transaction device, the switch causes the controller to display:
   video of a second transaction at the second transaction device captured by the second surveillance camera; and
   text corresponding to the second transaction superimposed on the video of the second transaction.

5. The video surveillance system as in claim 1 further comprising a storage device for storing the video from the surveillance camera and the transaction data from the transaction device.

6. The video surveillance system as in claim 5 wherein the storage device comprises a recording medium readable by a video playback system.

7. The video surveillance system as in claim 5 wherein the storage device comprises a computer-readable medium.

8. The video surveillance system as in claim 1 wherein the transaction device comprises a point-of-sale terminal.

9. The video surveillance system as in claim 1 wherein the transaction device comprises an ATM.

10. A surveillance controller for a video surveillance system, wherein the video surveillance system includes a surveillance camera for capturing video, a transaction device within a field of view of the surveillance camera, and a display, wherein the surveillance controller comprises:
    an input port for receiving transaction data from the transaction device and video from the surveillance camera;
    a switch operatively coupled to the transaction device via the input port;
    an output port for providing an output signal to the display, wherein in response to the switch receiving an exception from the transaction device indicating an error or fault, the switch automatically causes the output signal to display on the display:
       video of transactions captured by the surveillance camera occurring at the transaction device; and
       text extracted from the transaction data for each of the transactions superimposed on the video of each of the corresponding transactions, wherein superimposition of the text on the video of each of the transactions includes displaying the text on top of the corresponding video.

11. The surveillance controller as in claim 10 wherein the text that is superimposed on the video of a particular transaction corresponds to the receive transaction data that corresponds to that transaction.

12. The surveillance controller as in claim 10, wherein the input port is operatively coupled to a second transaction device and a second surveillance camera, and can receive second transaction data from the second transaction device, and wherein the output signal can selectively display:
    video of second transactions captured by the second surveillance camera at the second transaction device; and text extracted from the second transaction data for each of the second transactions superimposed on the video of each of the corresponding second transactions.

13. The surveillance controller as in claim 10, wherein the switch is also operatively coupled to a second transaction device via the input port, and in response to receiving an exception from the second transaction device, the switch causes the output signal to display on the display:

video of second transactions captured by a second surveillance camera at the second transaction device; and text for each of the second transactions superimposed on the video of each of the corresponding second transactions.

14. The surveillance controller as in claim 10 wherein the transaction device comprises a point-of-sale terminal.

15. The surveillance controller as in claim 10 wherein the transaction device comprises an ATM.

16. A non-transitory computer readable medium embodying instructions executable by a processor to:

receive transaction data from a transaction device and video from a surveillance camera, wherein the transaction device is within a field of view of the surveillance camera;

receive an exception from the transaction device indicating an error or fault; and in response to receiving the exception from the transaction device, the switch causes an output signal, wherein the output signal automatically causes a display to display:

video of a transaction at the transaction device captured by the surveillance camera; and text extracted from the transaction data corresponding to the transaction superimposed on the video of the transaction, wherein superimposition of the text on the video of the transaction includes overlaying the text on top of the video of the transaction.

17. The non-transitory computer readable medium as in claim 16 wherein the text that is superimposed on the video of a particular transaction corresponds to the receive transaction data that corresponds to that transaction.

18. The non-transitory computer readable medium as in claim 16 wherein the transaction device comprises a point-of-sale terminal or an ATM.

* * * * *